United States Patent [19]
Kumar

[11] Patent Number: 5,489,773
[45] Date of Patent: Feb. 6, 1996

[54] INTEGRATED PORTABLE DEVICE FOR POINT OF SALE TRANSACTIONS

[75] Inventor: Rajendra Kumar, Akron, Ohio

[73] Assignee: Khyber Technologies Corporation, Fairlawn, Ohio

[21] Appl. No.: 352,231

[22] Filed: Dec. 8, 1994

Related U.S. Application Data

[63] Continuation of Ser. No. 213,489, Mar. 15, 1994, Pat. No. 5,386,106, which is a continuation of Ser. No. 767,270, Sep. 27, 1991, Pat. No. 5,294,782.

[51] Int. Cl.$^6$ ..................................................... G06K 7/10
[52] U.S. Cl. .......................... 235/462; 235/472; 235/380
[58] Field of Search ................................. 235/379, 380, 235/381, 382, 383, 432, 462, 470, 472; 400/103, 104, 88

[56] References Cited

U.S. PATENT DOCUMENTS

| | | | |
|---|---|---|---|
| 4,706,095 | 11/1987 | Ono et al. | 346/76 PH |
| 4,722,054 | 1/1988 | Yorozy et al. | 364/401 |
| 4,967,366 | 10/1990 | Kaehler | 364/479 |
| 5,055,660 | 10/1991 | Bartagna et al. | 235/472 |
| 5,107,100 | 4/1992 | Shepard et al. | 235/472 |
| 5,149,947 | 9/1992 | Collins, Jr. | 235/462 |
| 5,253,345 | 10/1993 | Fernandes et al. | 235/380 X |
| 5,294,782 | 3/1994 | Kumar | 235/462 |
| 5,310,997 | 5/1994 | Roach et al. | 235/375 |
| 5,315,097 | 5/1994 | Collins, Jr. et al. | 235/472 |
| 5,386,106 | 1/1995 | Kumar | 235/462 |

FOREIGN PATENT DOCUMENTS

| | | | |
|---|---|---|---|
| 8706377 | 10/1987 | WIPO | 235/383 |

OTHER PUBLICATIONS

Brochure for Compact Electronic Payment, 2 pages 1988 Terminal Model TPCE 232, Electronique Savga Dassault.
Symbol Technologies Inc., Wireless Advertising Supplement to Retail Info. Systems News (Jan. 1992).
Symbol Technologies Inc., 1992 Annual Report, p. 15.
Telxon Corp., PosExpress Advertising Brochure, (Dec. 1992).

*Primary Examiner*—Edward P. Westin
*Assistant Examiner*—John R. Lee
*Attorney, Agent, or Firm*—Sand & Sebolt

[57] ABSTRACT

A handheld, portable device for processing point of sale transactions includes a housing, a magnetic card reader for reading credit card information, the reader carried within the housing substantially adjacent to the first end of the housing, a numeric keyboard and an alphabetic keyboard for entering customer information, and a barcode scanner for scanning product identification information, the barcode scanner carried within the housing substantially adjacent to a second end of the housing. Also included is a display for displaying selected information, a printer for printing a customer receipt, a communications assembly for furnishing the information needed to obtain transaction approval, and a processor for receiving the information, and controlling the display, the printer and the communications assembly. Device furnishes all functions necessary to facilitate and complete a point of sale credit card transaction. The housing configuration allows handsfree operation for most functions. The arrangement of components within device provides a uniform distribution of weight and makes supporting device with one hand comfortable and relatively effortless.

20 Claims, 5 Drawing Sheets

INTEGRATED PORTABLE DEVICE FOR POINT OF SALE TRANSACTIONS

CROSS REFERENCE TO RELATED APPLICATIONS

The present application is a continuation of patent application Ser. No. 08/213,489, filed Mar. 15, 1994, now issued into U.S. Pat. No. 5,386,106; which is a continuation of patent application Ser. No. 07/767,270, filed Sep. 27, 1991, now issued into U.S. Pat. No. 5,294,782.

TECHNICAL FIELD

The present invention relates in general to portable devices for data collection. More particularly, the present invention pertains to devices for transacting credit card sales as portable, handheld point of sale terminals. More specifically, the present invention relates to devices which provide all functions necessary for processing a credit card sales transaction remote from a conventional checkout register, including a credit card reader, data entry keyboard, barcode scanner, display, receipt printer, transaction approval communicator and controlling processor.

BACKGROUND ART

Data collection devices whose primary or exclusive function is as a point of sale (hereinafter POS) terminal are known and in recent years have become quite sophisticated, including a variety of functions to facilitate credit card sales transactions. For example, POS terminals have provided readers for reading customer information from the credit card, barcode scanners for automatically entering product information from barcodes on products, their label or packaging, keyboards for entering customer personal identification numbers and other transaction information and commands, displays, receipt printers, and telephone or computer links to obtain transaction approval.

Many businesses accepting payment by credit card, especially those engaged in retail sales or services, have found it desirable to employ less expensive and more flexible portable POS terminals to process credit card transactions for more expeditious customer checkout, and to address peak customer volume, reduce traffic at congested checkout counters, reduce capital equipment expenditures, provide additional, easily relocatable temporary checkout registers, and allow additional order-entry terminals for products presently unavailable at the point of sale, among other reasons. Invariably, however, existing POS terminals intended for portable operation fail to provide all functions necessary to facilitate credit card transaction processing by a portable, handheld POS terminal. Moreover, it is also evident that existing POS terminals have not begun to address component arrangement to facilitate handheld operation.

For example, U.S. Pat. No. 4,722,054 discloses an input system for a POS terminal having a portable unit which provides a card reader through which the customer may pass a credit card and a keypad into which a customer may input a personal identification number. The customer then returns the portable unit to the sales counter, where a salesperson connects it to a repeater to transmit that information to a stationary controller. Information on the purchased products must be manually entered into the stationary controller by the salesperson. In much the same manner, the unattached keypad shown in U.S. Pat. No. 4,967,366 only allows the remote entry of the customer's personal identification number; all other transaction information must be still entered into the fixed, POS authorization controller.

Another POS terminal, the Model E 232 Electronic Payment Terminal manufactured by Electronique Serge Dassault of St-Cloud Cedex, Franz, provides for magnetic card reading, a keypad, a readout screen and a printer to generate a receipt. Intended for electronic fund transfer authorization, this device not only does not include a barcode scanner, it also does not permit manual entry of purchasing product identification.

Thus, despite the increased popularity of the handheld POS terminal, no such terminal has been provided that provides all the necessary functions to allow the transaction to be completed at a location remote from stationary POS terminals, while simultaneously arranging components to facilitate handheld use.

SUMMARY OF THE INVENTION

It is, therefore, an object of the present invention to provide a portable, handheld data collection terminal including all necessary functions to facilitate and complete a point of sale credit card transaction.

It is another object of the present invention to provide a device, as set forth above, wherein component arrangement in the device is well-balanced, allowing mostly handsfree operation.

It is still another object of the present invention to provide a device, as set forth above, wherein component arrangement in the device makes supporting the device with one hand comfortable and relatively effortless.

These and other objects and advantages of the present invention over existing prior art forms will become more apparent and fully understood from the following description in conjunction with the accompanying drawings.

In general, a portable device for processing point of sale transactions embodying the concepts of the present invention includes a housing having a top surface, a bottom surface, a first end and a second end; a reader for reading credit card information, the reader carried within the housing substantially adjacent to the first end of the housing; first data entry means for entering customer information, the first data entry means carried by the housing; a scanner for scanning product identification information, the scanner carried within the housing substantially adjacent to the second end of the housing; a display for displaying selected of the credit card information, the customer information and the product identification information, the display carried within the housing so as to allow display at the top surface of the housing substantially adjacent to the scanner; a printer for printing a customer receipt, the printer carried within the housing closer to the second end of the housing than the first end of the housing; means for furnishing at least selected credit card information, customer information and product identification information to obtain transaction approval, the means for furnishing carried within the housing; and, a processor within the housing for receiving the credit card information, the customer information and the product identification information, and controlling the display, the printer and the means for furnishing.

PREFERRED EMBODIMENT FOR CARRYING OUT THE INVENTION

Figure 1:
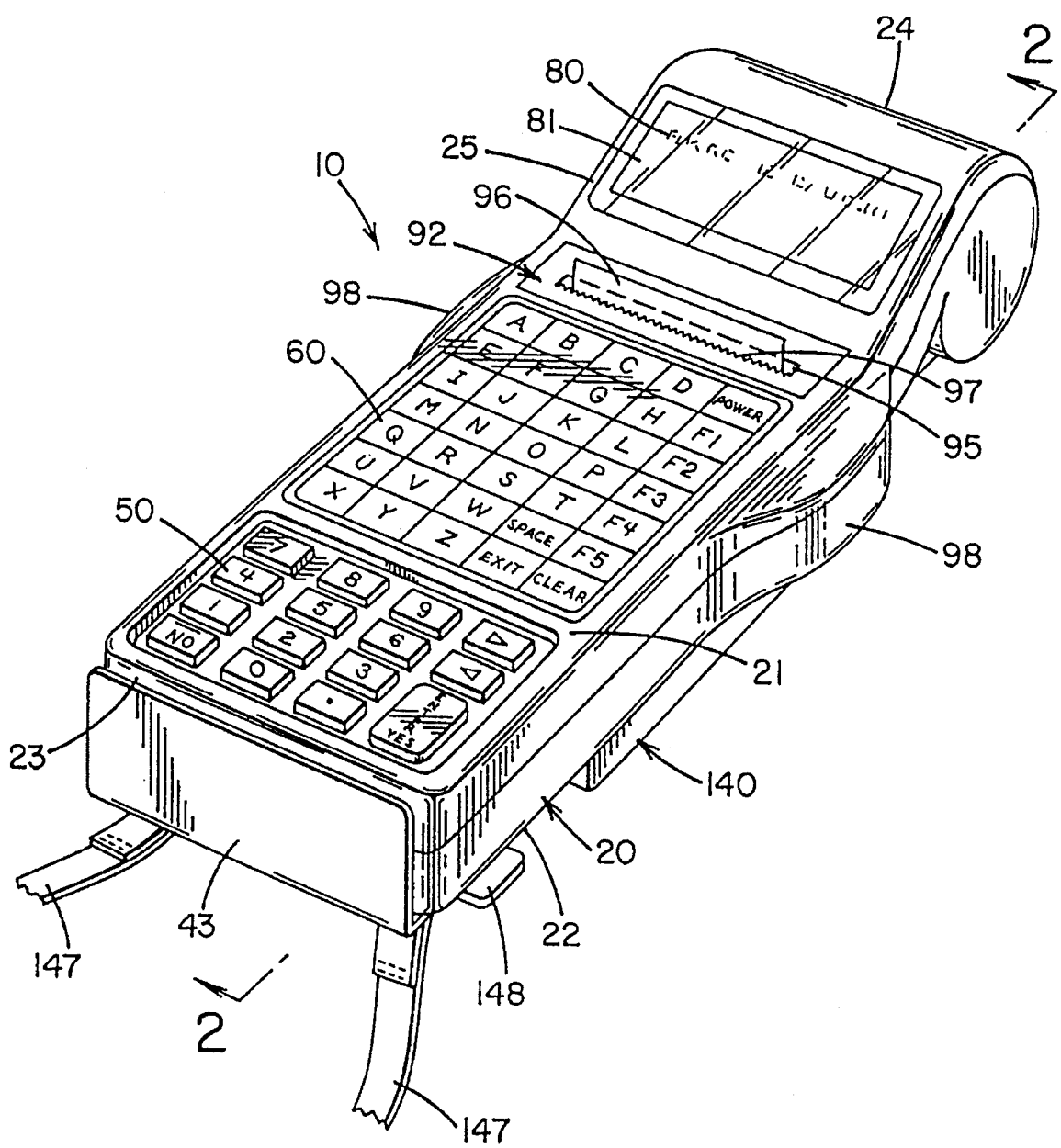
FIG. 1 is a top perspective view of an exemplary device in accordance with the present invention.

FIG. 1 presents in perspective an exemplary portable device in accordance with the present invention, generally indicated by the numeral 10, that within a single housing 20 integrally furnishes all functions necessary to complete a credit card transaction as a POS terminal and facilitate handheld operation. Device 10, best seen overall in FIGS. 1 and 2, the latter of which presents vertical sectional view of device 10 taken substantially along line 2—2 shown in of FIG. 1, may be made of several separate components furnishing various functions: magnetic card reader 40, first data entry keyboard 50, second data entry keyboard 60, barcode scanner 70, display 80, printer assembly 90, communications assembly 110 and processor assembly 130. Housing 20 may be formed by molding or other acceptable means of a suitable material such as a rigid plastic suitable to integrally carry all the components in a substantially rectangular block having a top surface 21, a bottom surface 22, a first end 23 and a second end 24. For reasons which will become more apparent hereinafter, a portion of the top surface 21 of housing 20 is sloped or titled upward moving from the first end 23 to the second end 24, as shown at 25. The width of housing 20 should be about what may be comfortably grasped in a human operator's hand, less than about four inches (10.16 cm).

Figure 6:
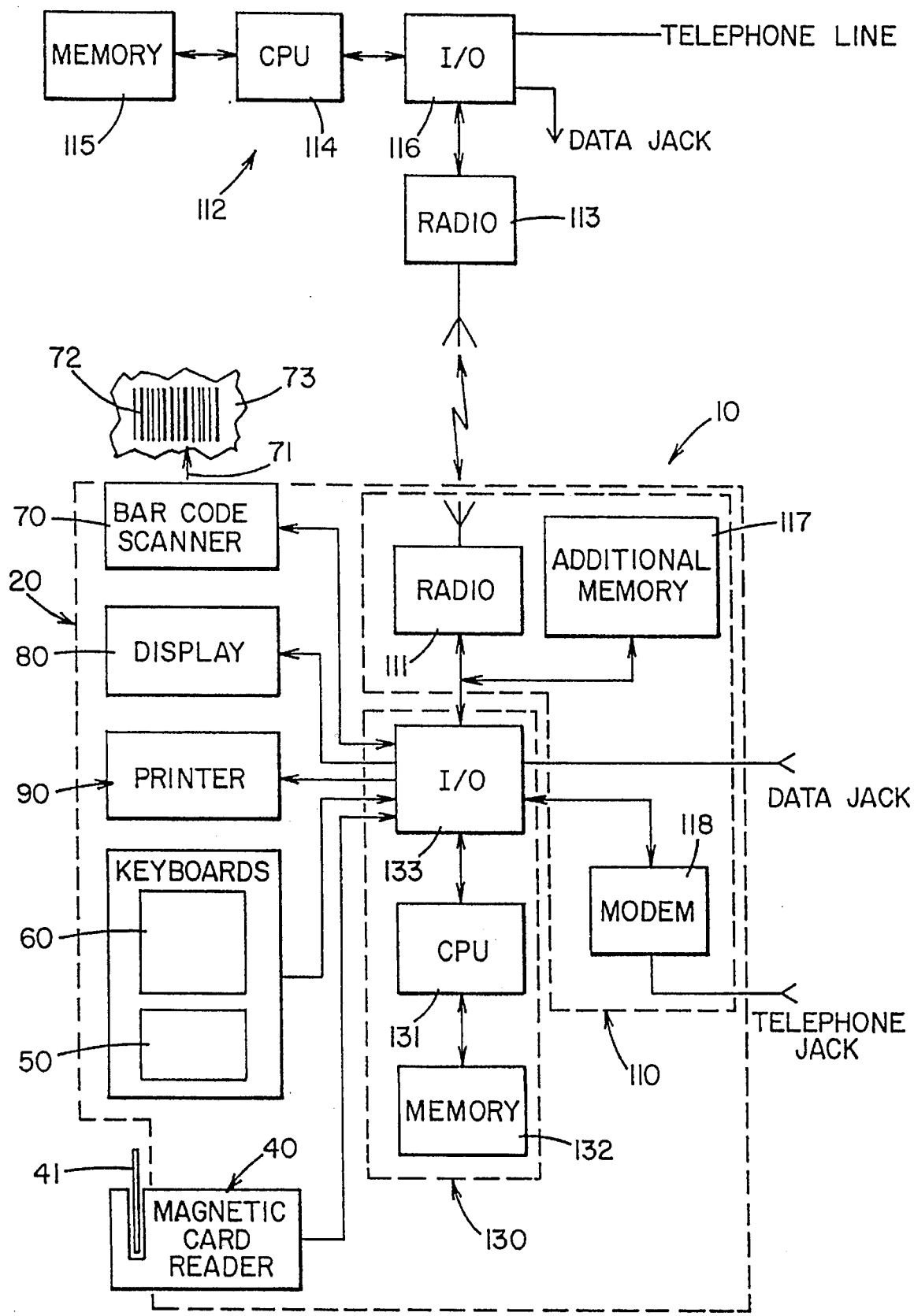
FIG. 6 is a block diagram of the functional components of the exemplary device shown in FIG. 1 and a device for obtaining credit card transaction approval including a transceiver for communication with the device of the present invention.

Magnetic card reader 40 may be any conventional reader suitable for reading credit card information encoded on a magnetic credit card 41 (FIG. 6) and carried and mounted by means not relevant hereto within housing 20 substantially adjacent to the first end 23 of housing 20 so as to allow an operator, whether a salesperson or customer, to wipe the magnetic stripe of the card across the exposed reading head 42 of magnetic card reader 40, as further discussed below. Of course, where credit card 41 employs a different information encoding method, such as optical or electrical, card reader 40 may be appropriately selected to respond to such other encoding method. A substantially planer card guide 43 for directing credit card 41 and its magnetic stripe into operative engagement with reading head 42 may be furnished and connected to housing 11 as with flat head screws 44.

First data entry keyboard 50 may be a conventional data entry mechanism, such as a keyboard with raised, travel-tactile keys, suitable for entry of customer information and, optionally, device commands. Keyboard 50 is carried and mounted by means not relevant hereto within housing 20 substantially adjacent to the first end 23 of housing 20 so as to allow the operator to make entries at the top surface 21 of housing 20, and is preferably relatively thin to preserve as much space as possible within housing 20.

Second data entry keyboard 60 also may be a conventional data entry mechanism, but where customer receipts are to be signed by the customer atop keyboard 60, is a substantially flat preferably membrane keyboard having a mylar, customizable, user-interchangeable keypad cover. Keyboard 60 may be suitable for entry of additional customer or other information, and is carried and mounted, again by means not relevant hereto, within housing 20 substantially adjacent to keyboard 50 so as to allow the operator to make entries at the top surface 21 of housing 20. A second keyboard is not essential to the successful operation of device 10 as explained hereinafter; however, a second keyboard may be advantageously utilized for primarily alphabetic and preselectable command function input while the first keyboard may be employed for primarily numeric and limited query response.

Barcode scanner 70 may be a compact mechanism for facilitating acquiring information about the item(s) the customer wishes to purchase, such as the CCD scanning module manufactured by Opticon Inc. of Orangeburg, N.Y., or a diode laser scanning module such as that available through Photographic Sciences Corp of Webster, N.Y. Optically scannable barcodes, now almost always placed on retail and inventory product, provides a unique product identification. As shown diagrammatically in FIG. 6, barcode scanner 70 generates a light scanning beam 71 for striking the barcode 72 applied to a product 73 to be purchased, its label or packaging. Barcode scanner 70 is carried within housing 20 by suitable means (not shown or relevant herein) such that the light scanning beam 71 is projected outwardly and upwardly from the upwardly inclined second end 24 of housing 20 through a light transparent window 74 (best seen in FIGS. 2 and 3). This orientation of light scanning beam 71 greatly enhances the ease with which the operator of device 10 may quickly and automatically identify all products to be purchased, as will be further explained hereinbelow.

Display 80 may be any conventional low-power consumption display such as a liquid crystal display for visual depiction of operating mode status, operator prompts, or any information acquired during the POS transaction. Display 80 may be carried and mounted by means not relevant hereto within housing 20 so that its display is viewable through a window in the upward sloping portion 25 of top surface 21.

Figure 4:
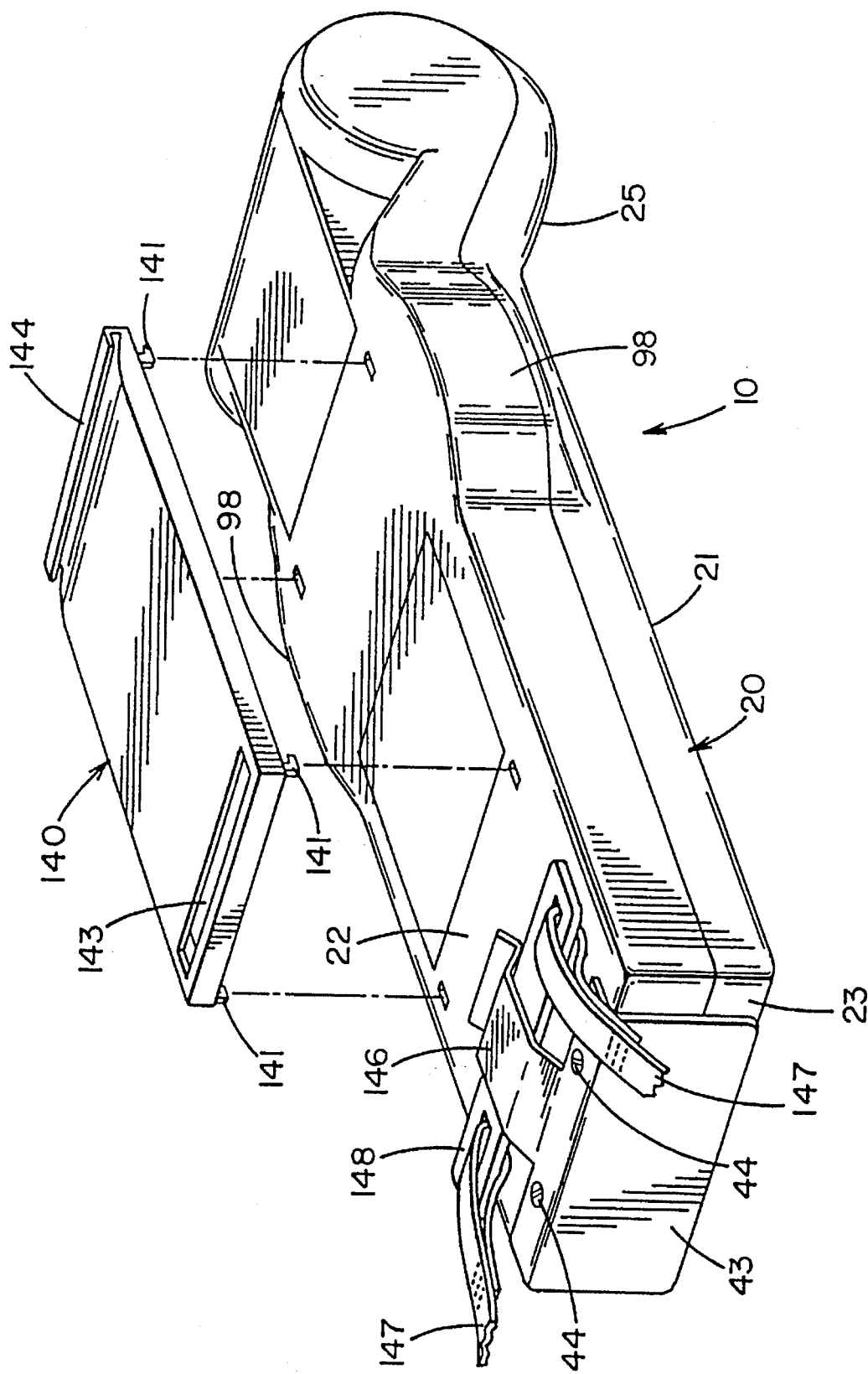
FIG. 4 is a bottom perspective view of the exemplary device shown in FIG. 1, depicting a receipt caddy in exploded view format.

Printer assembly 90 may include any conventional receipt printer 91 able to print a narrow customer receipt in duplicate original, one copy of which is retained by the operator and the other given to the customer, a paper exit cover 92 and a printer paper holder 93. One suitable compact impact receipt printer 91 capable of printing 24 characters per line on 2.26 inch (5.74 cm) wide two-ply paper is dot matrix printer Model M-180 Ultra Small-Sized Printer available from Epson America Inc. of Torrance, Calif. Receipt printer 91 is carried within and mounted by means not relevant hereto to housing 20 such that paper exiting receipt printer 91 passes directly to paper exit cover 92 described further hereinafter. The width of receipt printer 91 may require housing 20 to include slight side protuberances 98 for accommodation, as shown in FIGS. 1 and 4.

Figure 2:
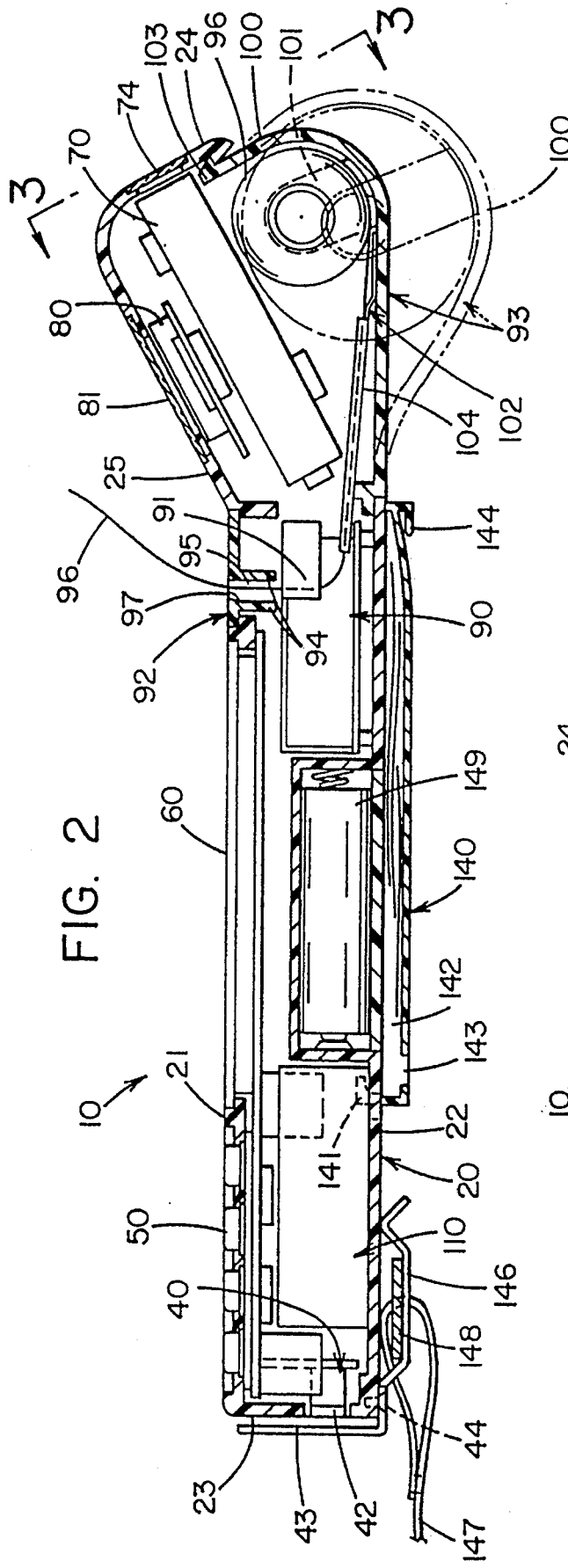
FIG. 2 is a vertical sectional view of the exemplary device shown in FIG. 1 taken substantially along line 2—2 shown in of FIG. 1.
Figure 3:
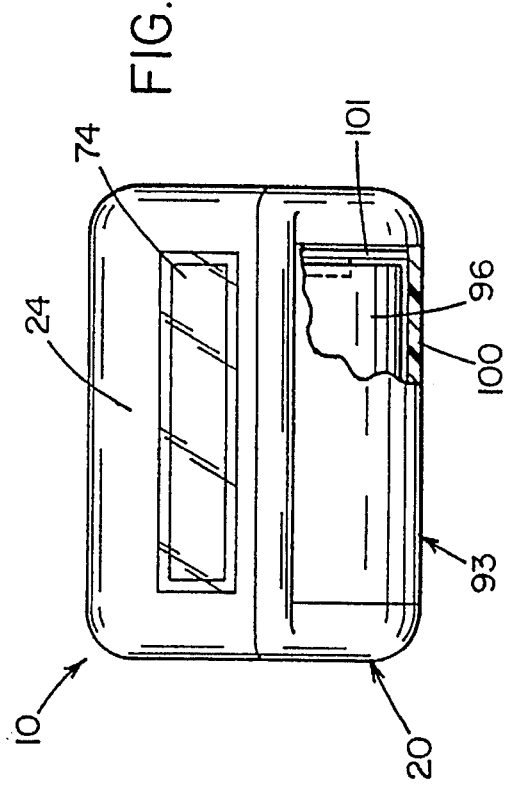
FIG. 3 is a rear view of the exemplary device shown in FIG. 1 taken substantially along line 3—3 shown in FIG. 2 showing the scanner window and paper holder.
Figure 5:
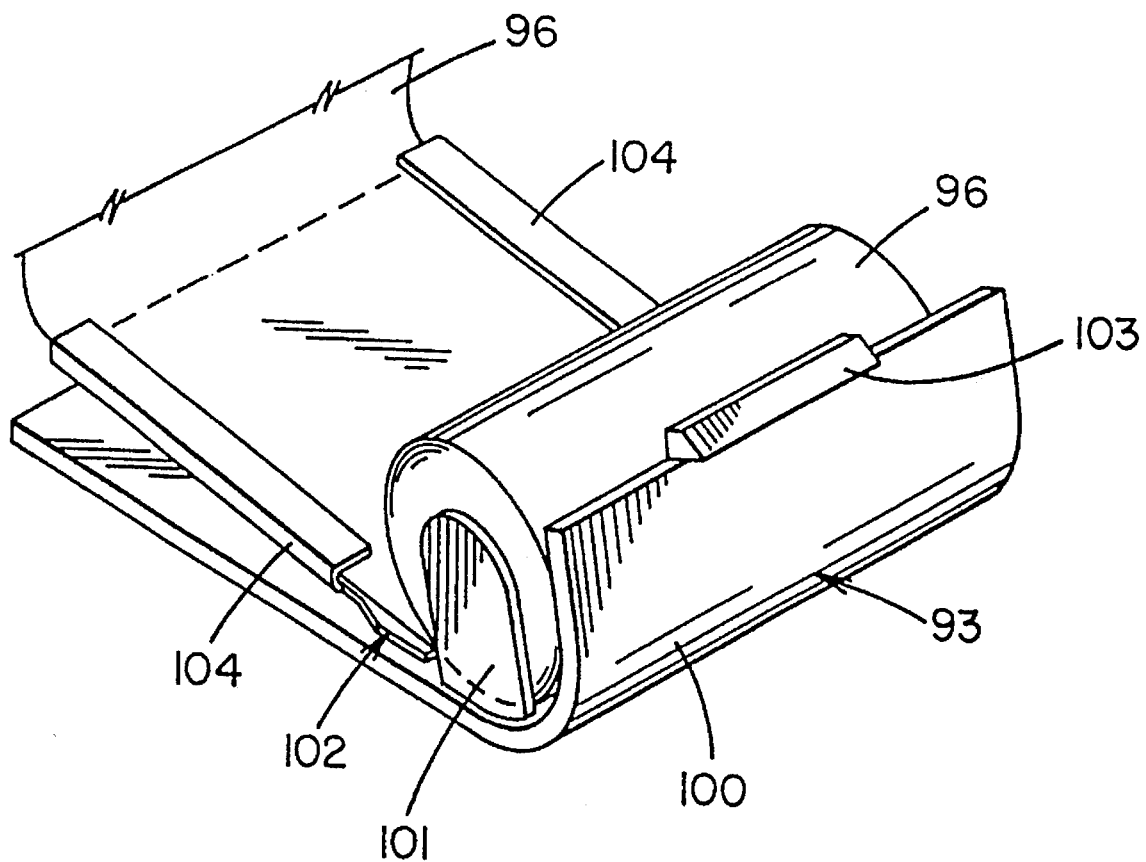
FIG. 5 is prospective view of an exemplary paper holder assembly.

Paper exit cover 92, best shown in FIGS. 1 and 2, is mounted in the top surface 21 of housing 20 between the inclined portion 25 and keyboard 60, and includes two parallel flanges 94 forming a guide channel 95 for directing the printer paper 96 out of device 10, and a serrated cutting edge 97. Printer paper holder 93, best depicted in FIGS. 2 and 5, includes a plate 100 contoured to removably, matingly engage the lower portion of the second end 24 of housing 20 and a portion of the bottom surface 22 of housing 20 nearby the second end 24, posts 101 to carry a roll of printer paper 96, and an angled paper guide 102 for optimally directing printer paper 96 into paper receipt printer 91. A plurality of interchangeable plates 100 may be formed with sufficient curvature to receive rolls of printer paper 96 of different diameter, as may be desired by the operator and as shown in phantom in FIG. 2. An interlock 103 may be integrally formed in plate 100 to allow the requisite removable, mating engagement with housing 20. The side edges of paper guide 102 may be made slightly wider than that of printer paper 96 sufficient to fold over and furnish paper edge guides 104 for more readily directing printer paper 96 into the printhead of receipt printer 91.

Prior to initial operation, and anytime the supply of receipt paper 91 is substantially depleted, the operator may install or replenish the supply by applying slight pressure on plate 100 under interlock 103 and removing the printer paper holder from its operational position. A new roll of printer paper 96 is placed between posts 101, and the free end of printer paper 96 inserted through paper guide 102. Thereafter plate 100 is reinserted into housing 20, placing the free end of printer paper 96 into receipt printer 91, and a preselected keyboard button actuating the paper feed by receipt printer 91 depressed until printer paper 96 extends through guide channel 95 and out past serrated cutting edge 97. Device 10 is then ready to print customer receipts.

Processor 130 may include any conventional central processing unit (CPU) 131, microprocessor or microcomputer having sufficient capacity to control operation of device 10, memory 132 to retain the control program and an input/output circuit 133 for receiving and conditioning all control and data signals.

Communications assembly 110 allows device 10 to obtain approval of credit card transactions, and may include, alternatively or in combination, the components necessary to effect several different methods of obtaining such approval. For example, device 10 may include a conventional radio frequency transceiver 111, preferably employing spread spectrum modulation, to send the information necessary for approval to a base station 112 including a like transceiver 113, central processing unit 114, memory 115 and input/output circuit 116 connected to a telephone line. Base station 112 will call the credit card verification telephone number, forward the necessary information, and receive and radio back to device 10 approval or disapproval. If desired additional memory 117 may be included within communications assembly 110 to store the information necessary for approval and transmit all such information in one or more larger data batches, instead of transmitting each piece of information as it is read, scanned or entered in device 10. Data jacks suitable for direct serial data transmission may be provided in both device 10 and base station 112, and device 10 and base station 112 plugged together to effect transfer. A modem 118 and telephone jack may be installed within device 10, and device 10 plugged directly into the public telephone network to obtain transaction approval. Communications assembly 110 may be carried within and mounted by means not relevant hereto to housing 20 substantially adjacent to magnetic card reader 40 underneath keyboard 50.

Device 10 may include a caddy 140 to facilitate signature of the customer receipt and temporarily store the operator's copy of the signed receipt. One suitable caddy 140 is illustrated in partial exploded form in FIG. 4 where a five-sided, substantially planer tray only slightly narrower than the width of device 10 is seen to include four corner hooks 141 for removable, sliding engagement with the bottom surface 22 of housing 20, thereby providing a receipt storage chamber 142. The height of caddy 140 may be selected by the manufacturer, and holders having a variety of heights may be made available, but a shallow depth of about 3/16 inch (0.48 cm) is believed to provide adequate storage capacity for many applications. An aperture 143 through which signed customer receipts may be inserted into holder 141 may be formed at the end closest to the first end 23 of housing 20, and a receipt holding recessed flange 144 integrally formed into the end of caddy 140 closest to the second end 24 of housing 20 with a very small clearance above the preferably recessed top surface of caddy 140. When a customer receipt is printed and ready for signature, the operator of device 10 may turn it over, slip a narrow end of the customer receipt under recessed flange 144, securing the receipt by interference fit and providing a hard, flat surface for signature by the customer. A raised flange (not shown) also may be integrally formed into housing 20 extending from top surface 21 between the keyboard 50 and keyboard 60 such that the customer receipt is positioned over the flat keyboard 60 for signature, and keyboard 60 selectively, temporarily deactivated during such signature.

FIG. 4 also presents two mechanisms for carrying of device 10 by the operator. The first mechanism is a somewhat s-shaped, flexible clothing (including belt) hook 146 that may be integrally formed with the card guide 43 so that it extends out from the center thereof along the bottom surface 22 of housing 20. The second mechanism is an adjustable neck strap 147 the ends of which are secured to the opposite ends of a closure bar 148, which is in turn slid under clothing hook 146. Closure bar 148 may be made to extend beyond the width of device 10 to facilitate separation of closure bar 148 from device 10. Carry device 10 with such mechanisms allows device 10 to be hung from the operator's clothing in a vertical orientation with the first end 23 closest to the operator's head and the second end 24 furthest therefrom whether device 10 is suspended from the operator's clothing or from the neck strap positioned around the operator's neck. In such a position the operator will have both hands free for other operations and device 10 will be stabilized by the front of the operator's body.

A self-contained energy source such as batteries 149 are carried within and mounted by means not relevant hereto to housing 20 between communications assembly 110 and receipt printer 91 underneath keyboard 60.

Operation of device 10 is straightforward. For purposes of explanation it shall be assumed that a supply of printer paper 96 is installed within device 10, device 10 is transmitting necessary information to base station 112 for transaction approval, and a customer has approached the operator with several products to be purchased in a credit card transaction, all as discussed above.

First, allowing device 10 to hang vertically free from the operator's clothing or neck, the operator may use both hands to guide the products to be purchased so that barcodes thereon pass beneath barcode scanner 70. The angular orientation of the upward sloping portion 25 of top surface 21, which for this example is believed to be about 30 degrees, positions the scanner window at an ideal angle to facilitate scanning product barcodes and simultaneously allow the operator to view display 80. In essence, this incline allows the operator's hands to remain free while operating device 10.

Once all products to be purchased have been scanned, and at any time during operation when keyboard input is required or desired, the operator may use one hand to lift device 10 in its middle and the other hand to press the desired keys. The arrangement of components within device 10 provides a uniform distribution of weight and makes supporting device 10 with one hand comfortable and relatively effortless.

At any convenient time, but most likely either before or after scanning is complete, the operator, while allowing device 10 to hang free, may use one hand to pass the customer's charge card by magnetic card reader 40 and, if desired, use the other hand to lightly secure device 10 from any slight lateral motion.

Thereafter, the operator may package the purchased products during which time device 10 will most likely receive a transaction approval from base station 112 and automatically print a customer receipt. The operator then tears off the customer receipt, places it under recessed flange 144 atop receipt caddy 140, and requests that the customer sign it. After it has been signed, the two-ply customer receipt is removed, a copy handed to the customer or placed in the products package, and the operator's copy passed through aperture 143 into chamber 142. At this juncture the operator and device 10 are ready to process another transaction. At any convenient time caddy 140 may be removed and all receipts in chamber 142 withdrawn.

In addition to the aspects of the present invention noted above, other alternatives and features should now be apparent. For example, in the preferred embodiment shown and described herein the angle of sloping portion 25 of top surface 21 is about 30 degrees. However, it should be apparent to one skilled in the art, that other values are possible without departing from the spirit of the present invention. Also, as should again be apparent to one skilled in the art, barcode scanner 70 could employ a removable wand. Still other modifications that should be understood embrace using any suitable form of modulation in communications assembly 110, including infrared where there exists a clear line of sight to base station 112, and the substitution of only additional memory 117 for communications assembly 110. In the later instance, additional memory 117 will retain all information necessary for transaction approval.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of portable data collection and, more particularly, portable handheld POS terminals.

I claim:

1. A portable device for processing point of sale transactions, the portable device having a plurality of components carried and oriented to facilitate handsfree operation by a user, comprising:

housing means for carrying the components, said housing means having an operational orientation relative to the user;

reader means carried by said housing for reading credit card information;

scanner means for generating a scanning beam and scanning product identification information with said beam, said scanner means carried by said housing at a location such that when said housing is in said operational orientation said scanner beam is projected substantially away from the eyes of the user; and printer means for printing a customer receipt, said printer means carried by said housing at a location such that when said housing is in said operational orientation said printer receipt is visible to the user and said housing is substantially balanced for handsfree operation.

2. A portable device for processing point of sale transactions, as set forth in claim 1, further including:

display means for displaying selected of said credit card information and said product identification information, said display means carried within said housing at a location such that when said housing is in said operational orientation said display means is visible to the user and said housing is substantially balanced for hands-free operation;

means for furnishing at least selected of said credit card information, said customer information and said product identification information to obtain transaction approval, said means for furnishing carried within said housing at a location such that when said housing is in said operational orientation said housing is substantially balanced for hands-free operation; and, processor means within said housing for receiving said credit card information, said customer information and said product identification information, and controlling said display means, said printer means and said means for furnishing.

3. A portable device for processing point of sale transactions, the portable device having a plurality of components carried and oriented to facilitate hands-free operation by a user, comprising:

housing for carrying the components, said housing means having an operational orientation relative to the user;

display means for displaying product and customer identification information, said display means carried by said housing at a location such that when said housing is in the said operational orientation said display means is visible to the user and said housing is substantially balanced for hands-free operation;

data entry means for entering customer and product information, said data entry means carried by the housing; and printer means for printing a customer receipt, said printer means carried by said housing such that the printer receipt is visible to the user when the housing is in said operational orientation.

4. A portable device for processing point of sale transactions, as set forth in claim 3, in which a paper exit means is included in said housing between said data entry means and said display means adapted for receiving an end of a paper roll exiting the printer means.

5. A portable device for processing point of sale transactions, as set forth in claim 4, in which the paper exit means is a paper exit cover attached to the housing.

6. A portable device for processing point of sale transactions, as set forth in claim 3, in which the housing includes a bottom wall, and in which at least a portion of the printer means is interposed between the data entry means and said bottom wall.

7. A portable device for processing point of sale transactions, as set forth in claim 3, in which the housing includes removable printer paper holder means adapted for holding a supply of paper for said printer means and for directing the paper into said printer means.

8. A portable device for processing point of sale transactions, as set forth in claim 7, in which the housing includes a first end and a second end and in which the printer paper holder includes a plate contoured to matingly engage a first portion of said second end of said housing and a portion of said bottom surface of said housing nearby said second end, said plate being curved to carry a substantially cylindrical roll of said supply of paper of a preselected maximum diameter, and further including the substantially planer paper guide in operative association with said plate for directing the paper into said printer means.

9. A portable device for processing point of sale transactions, as set forth in claim 8, further comprising scanner means for generating a scanning beam adjacent a second portion of the second end of the housing.

10. A portable device for processing point of sale transactions, as set forth in claim 3, in which the housing includes a top wall, and in which the data entry means is a keyboard carried by said top wall.

11. A portable device for processing point of sale transactions having a plurality of components, said portable device comprising:
 a housing for carrying by the user having an operational orientation which when carried by the user is hands-free, said housing including a first end and a second end;
 a printer for printing a customer receipt, said printer carried by said housing at a location such that when said housing is in said operational orientation said printer receipt is visible to the user and said housing is substantially balanced for hands-free operation;
 printer paper holder means for holding a supply of paper adjacent said printer matingly engaging said second end of the housing; and
 data input means carried by the housing and adjacent both the second end of the housing and the printer paper holder means whereby the data input means is accessible to the user when said housing is balanced for hands-free operation.

12. A portable device for processing point of sale transactions having a plurality of components, said portable device comprising:
 a housing for carrying by the user having an operational orientation which when carried by the user is hands-free, said housing including a top surface, a bottom surface, a first end and a second end;
 the second end having a first portion and a second portion;
 a printer for printing a customer receipt, said printer carried by the housing adjacent the first portion of the second end and at a location such that when said housing is in said operational orientation said printer receipt is visible to the user and said housing is substantially balanced for hands-free operation;
 data input means carried by the housing accessible to the user when said housing is balanced for hands-free operation and adjacent the second portion of the second end; and
 printer paper holder means carried by the housing adjacent the printer.

13. A portable device for processing point of sale transactions, as set forth in claim 12, in which the printer paper holder means includes a substantially planer paper guide for directing the paper into the printer.

14. A portable device for processing point of sale transactions, as set forth in claim 13, in which the paper guide is positioned on the portable paper holder means adjacent the printer, and the printer paper holder means is adapted to retain a paper roll at least partially under the data input means.

15. A portable device for processing point of sale transactions, as set forth in claim 14, in which the printer paper holder means includes a plate contoured to matingly engage the first portion of said second end of said housing and a portion of said bottom surface of said housing nearby said second end, said plate being curved to carry a substantially cylindrical roll of a supply of paper of a preselected maximum diameter.

16. A portable device for processing point of sale transactions, as set forth in claim 15, in which the data input means is a scanner for generating a scan beam and scanning product identification information with said beam.

17. A portable device for processing point of sale transactions, as set forth in claim 16, further comprising a display for displaying selected consumer and product identification information, said display means positioned on the opposite side of the printer as the removable printer paper holder means.

18. A portable device for processing point of sale transactions, as set forth in claim 17, in which the display is angularly oriented upwardly and away from the printer, and substantially parallel to the data input means such that when the housing is in the operational orientation, said display is visible to the user.

19. A portable device for processing point of sale transactions, the portable device having a plurality of components carried and oriented to facilitate hands-free operation by a user, comprising:
 housing means for carrying the components, said housing means having an operational orientation relative to the user;
 reader means carried by said housing for reading credit card information;
 scanner means for generating a scanning beam and scanning product identification information with said beam, said scanner means carried by said housing at a location such that when said housing is in said operational orientation said scanner beam is projected substantially away from the eyes of the user; and
 display means for displaying product and customer identification information, said display means carried by said housing at a location such that when said housing is in the said operational orientation said display means is visible to the user and said housing is substantially balanced for hands-free operation.

20. A portable device for processing point of sale transactions, as set forth in claim 19, further comprising:
 means for furnishing at least selected of said credit card information, said customer identification information and said product information to obtain transaction approval, said means for furnishing carried within said housing at a location such that when said housing is in said operational orientation said housing is substantially balanced for hands-free operation; and
 processor means within said housing for receiving said credit card information, said customer information and said product identification information, and controlling said display means, said printer means and said means for furnishing.

* * * * *